Aug. 22, 1944.   T. T. N. BUCHER   2,356,649
TOASTER
Filed May 6, 1942   5 Sheets-Sheet 1

Inventor:
Thomas Talbot Nelson Bucher
by his Attorneys
Howson & Howson

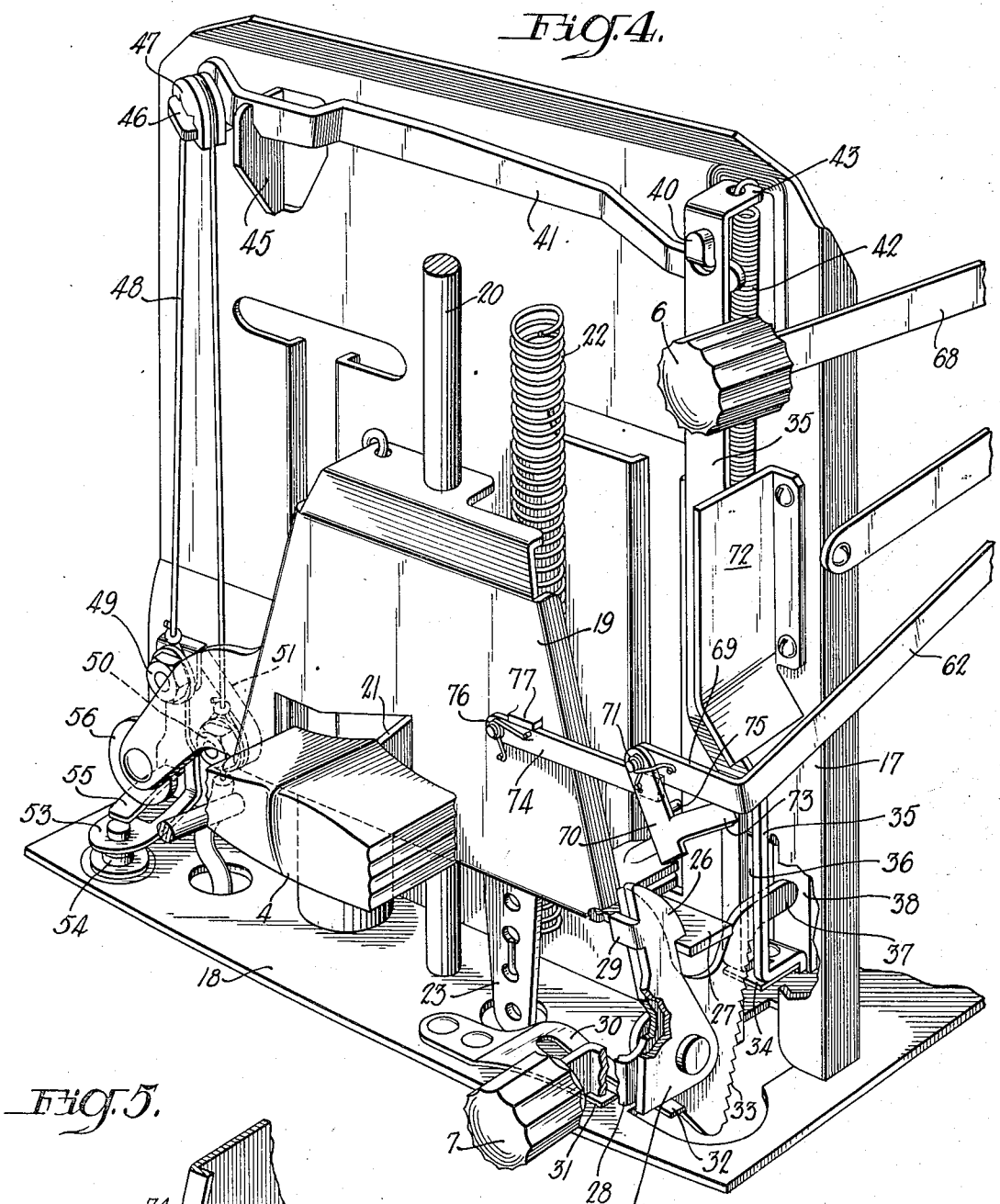
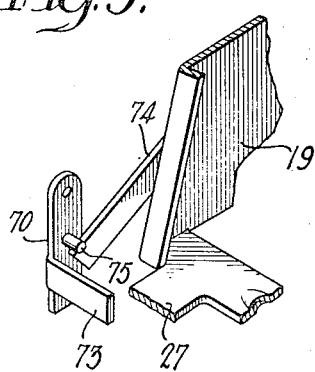

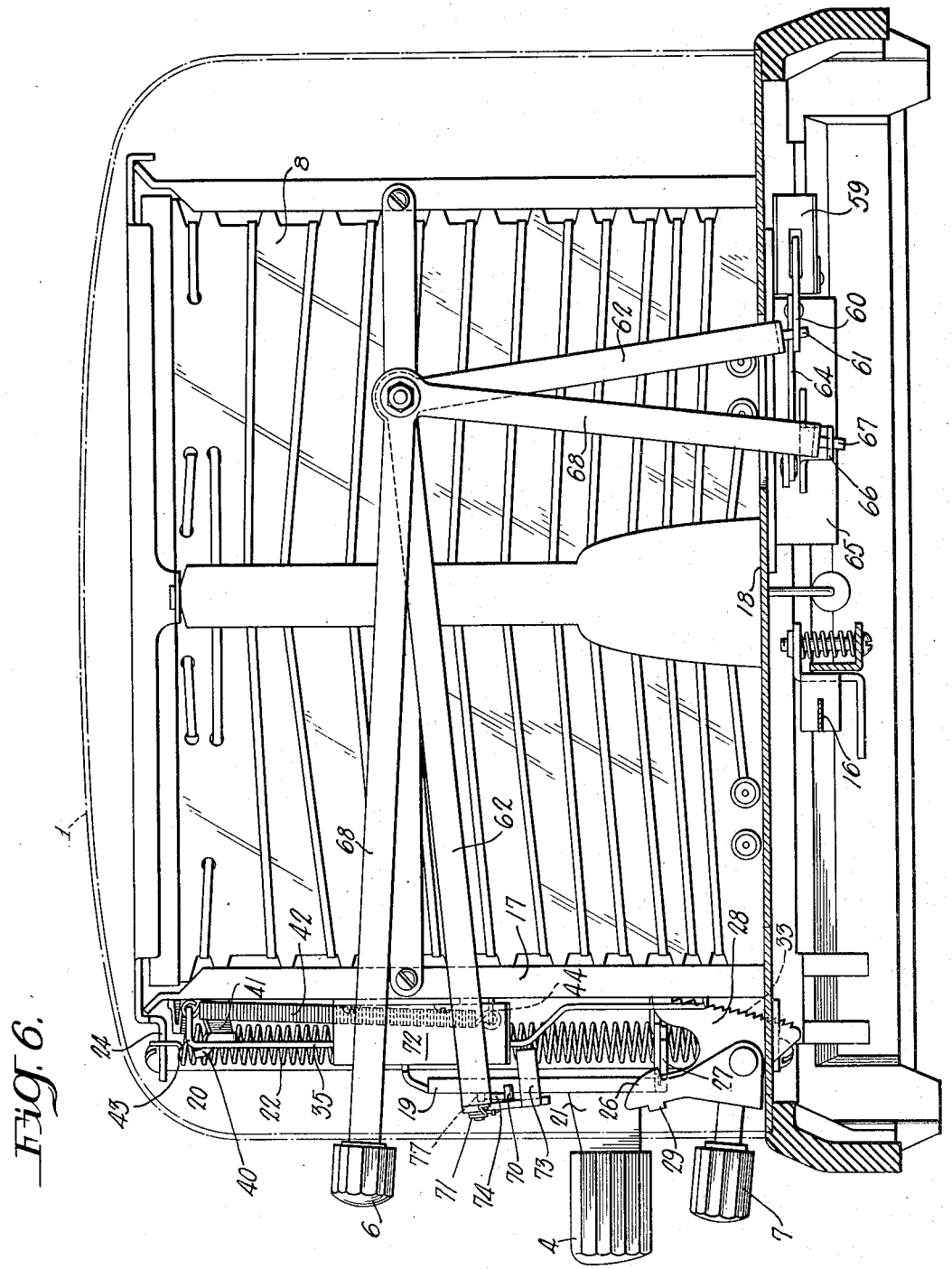

Aug. 22, 1944. T. T. N. BUCHER 2,356,649
TOASTER
Filed May 6, 1942 5 Sheets-Sheet 4

Inventor:-
Thomas Talbot Nelson Bucher
by his Attorneys
Howson & Howson

Aug. 22, 1944. T. T. N. BUCHER 2,356,649
TOASTER
Filed May 6, 1942 5 Sheets—Sheet 5
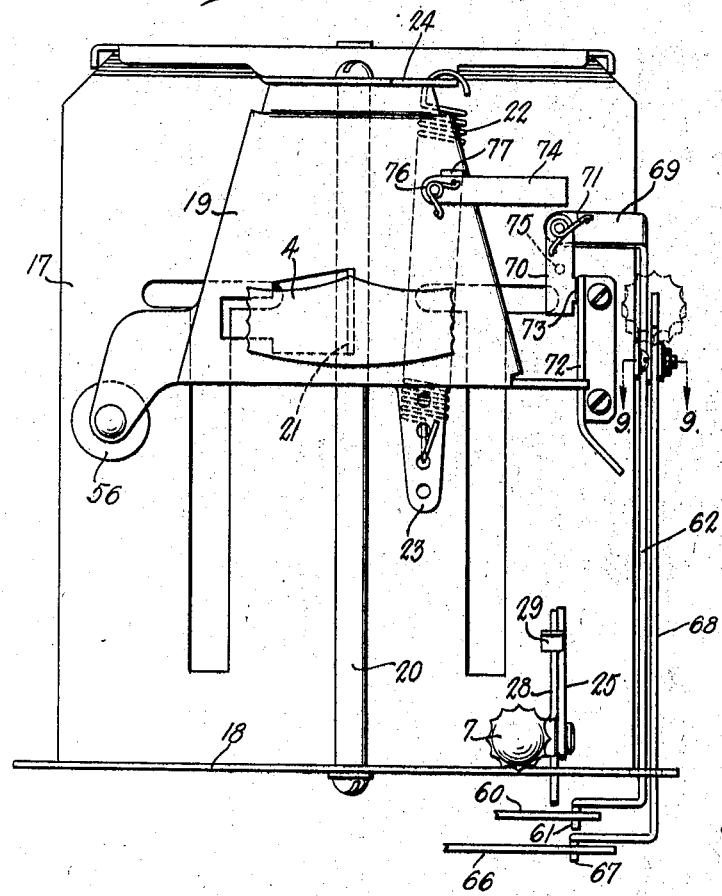
Inventor:-
Thomas Talbot Nelson Bucher
by his Attorneys
Howson & Howson Patented Aug. 22, 1944

2,356,649

UNITED STATES PATENT OFFICE 2,356,649

TOASTER

Thomas Talbot Nelson Bucher, Narberth, Pa., assignor to Proctor & Schwartz, Inc., Philadelphia, Pa., a corporation of Pennsylvania Application May 6, 1942, Serial No. 441,952

18 Claims. (Cl. 99—328)

This invention relates to automatic electric toasters, and more particularly to toasters in which provision is made for the operator to manually select the color of toast and also the degree of texture or crispness of the toast.

It is the principal object of this invention to provide an improved toaster of this type. It has been proposed heretofore to toast bread to varying degrees of crispness in a toasting operation in which the toasting cycle is divided into two parts, as broadly disclosed and claimed in the copending application of J. W. Myers, Serial No. 379,706, filed February 19, 1941. During one part of the toasting cycle, the bread is subjected to a low average toasting rate, primarily for imparting to it a desired degree of crispness. During the other part of the toasting cycle, the bread is subjected to a high average toasting rate, primarily for imparting the desired color to the toast. By varying the duration of the one part, the degree of crispness may be varied, and by varying the duration of the other part, the degree of color may be varied.

In the above-mentioned Myers application, there is disclosed an automatic electric toaster in which the coloring operation is performed during the first part of the toasting cycle, and the crisping operation is performed during the second part of the cycle.

The present invention contemplates first subjecting the bread to the crisping part of the cycle, while the surface of the bread is in a soft condition, so that the moisture may more readily escape, and thereafter subjecting the bread to the coloring part of the cycle.

Another object of the invention is to provide a low average toasting rate during the first part of the toasting cycle, and to provide a relatively high average toasting rate during the latter part of the cycle, whereby the bread is first crisped to the desired degree and is then colored to the desired color.

A further object of this invention is to provide a toaster of the type set forth, wherein exactly the same color of toast is obtained at a given color setting, irrespective of the setting of the crispness control.

Further objects of the invention will be set forth or become apparent hereinafter.

A clear understanding of the invention may be had by reference to the accompanying drawings, in which:

Fig. 4 is a perspective view showing particularly the latch-control mechanism;

Fig. 5 is a detail perspective view of certain parts;

Fig. 6 is a side elevational view of the toaster with the outer casing removed;

Fig. 8 is a face view of the front plate and associated parts;

Fig. 9 is a sectional view taken along line 9—9 of Fig. 8;

Fig. 10 is a detail view of the clock mechanism employed;

Fig. 11 is a sectional view taken along line 11—11 of Fig. 10; and

Fig. 12 is a schematic wiring diagram of the toaster circuit.

Figure 1:
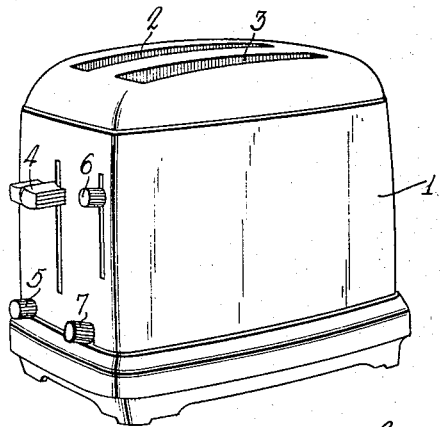
Fig. 1 is a perspective view of a toaster embodying the invention.

Referring first to Fig. 1, there is shown a toaster of the two-well type designated generally by reference character 1, the bread wells being shown at 2 and 3. The controls extend from an end of the device as illustrated. At 4, there is shown a depressible knob by means of which the bread carriage is moved to its toasting position to initiate the toasting operation. At 5, there is shown a manually rotatable color control knob by means of which the user is enabled to select the desired color of the toast. At 6, there is shown a depressible control knob by means of which the user is enabled to select the desired degree of crispness of the toast. At 7, there is shown a latch release knob for terminating the toasting operation at will. The two knobs 5 and 6 serve to adjust certain operating parts of the toaster, as described hereinafter, to effect toasting of the bread to the desired color and the desired degree of crispness, according to the present invention.

Figure 2:
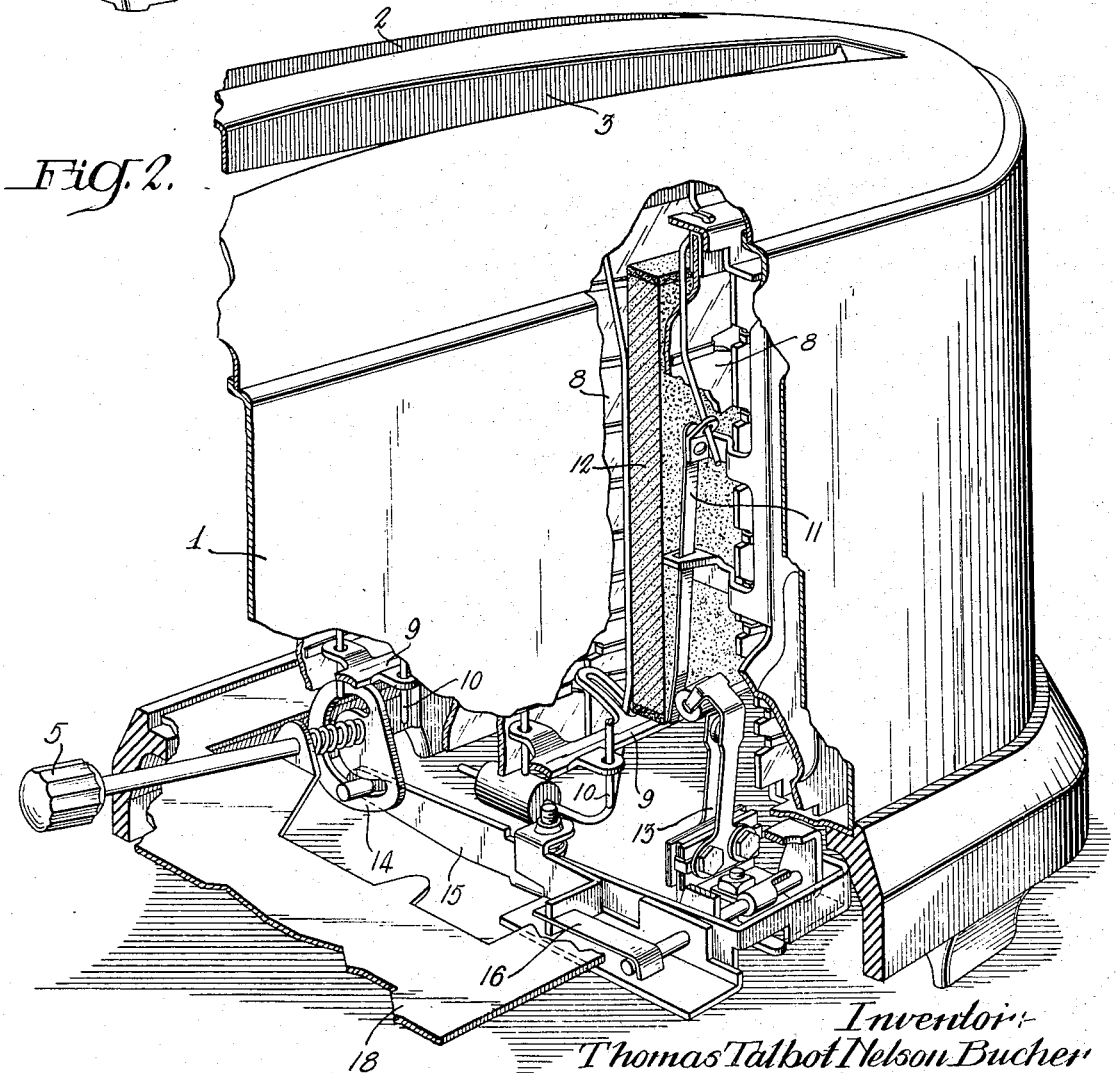
Fig. 2 is a fragmentary perspective view showing the thermostatic control mechanism.

Referring now to Fig. 2, the general construction of the toaster and the thermostatic control mechanism thereof, is preferably similar to that disclosed and claimed in the Myers and Stevenson Patent No. 2,179,422, granted November 7, 1939, although the heating elements are different as described hereinafter. For the purposes of the present invention, it will be unnecessary to describe this structure in great detail. The heating elements are shown generally at 8. The bread carriage is shown at 9, and comprises elements slidably mounted with reference to the vertical rods 10. The thermostatic element is shown at 11, and is adapted to engage a bread slice, represented at 12, and the thermostatically-controlled switch is shown at 13. This switch is adjustable by means of the knob 5, which is operable through the slotted cam 14 and arm 15 to adjust the switch 13 relative to the thermostatic element 11. This thermostatic control mechanism also includes a compensating thermostatic element 16. A detailed description of this mechanism is set forth in the above-mentioned patent.

Referring now to Figs. 4, 6 and 8, and particularly to Fig. 4, the framework of the toaster includes an end plate 17 and a base plate 18, with which the mechanism now to be described is associated. The bread carriage includes, as a part thereof, a plate 19 which is slidable along a vertical support and guide post 20. The knob 4, previously mentioned, is carried by an extension 21 turned out from the body of plate 19. A spring 22 has its lower end secured to extension 23 on plate 19, while the upper end of the spring is anchored to the top plate 24 of the framework. This spring urges the bread carriage upward to its discharge position. By means of the knob 4, the carriage may be moved downward against the action of spring 22 to its toasting position. The carriage is held in its toasting position by means of a pivoted latch 25, the hooked end 26 of which is adapted to engage a cooperating latch member 27 extending from the plate 19. Immediately adjacent the pivoted latch member 25 is a pivoted latch-tripping member 28, which carries the knob 7 on its forwardly extending end. The tripping member 28 is thus arranged to engage an extending lug 29 on the latch member 25. A leaf spring 30 is secured to the base plate 18 and has projecting fingers 31 and 32 arranged to resiliently engage the members 28 and 25 respectively. Thus, the said members are urged toward latching position. Whenever it is desired to trip the latch manually, the knob 7 is depressed, thereby rocking the latch member 25 to release the bread carriage, permitting the spring 22 to move the carriage to its discharge position.

The latch tripping member 28 is automatically controlled by the operation of a ratchet and pawl device. The tripping member 28 is formed to provide an inclined toothed edge 33 thereon, the teeth of which project downwardly. Associated with this ratchet is a pawl member 34 carried at the lower end of a vertical bar 35. The bar 35 is slotted at 36 to accommodate an extension 37 of the tripping member 28 above the teeth 33. The extension 37 is adapted to abut against a stop 38, formed integrally with the end plate 17. Thus, the stop 38 limits the clockwise movement of the tripping member 28, as viewed in Fig. 4.

The bar 35 is provided with an aperture near its upper end and is suspended on a hook 40 on the end of a transverse lever 41. A spring 42 has its upper end secured to the upper turned end 43 of bar 35, while the lower end of this spring is anchored to a turned out lug 44 on plate 17. Thus, the spring 42 tends to urge the bar 35 downward, and by virtue of its arrangement, the spring also tends to rock the bar 35 slightly outward about its pivotal mounting point at 40. This action of the spring tends to bring the pawl 34 into engagement with the ratchet teeth 33. When the bread carriage is in its raised inoperative position, the extension 27 bears against the upper portion of bar 35 and maintains the pawl 34 out of engagement with the teeth. However, when the bread carriage is moved downward to its toasting position, the bar 35 is released by virtue of the lower portion thereof being offset and free of engagement with the extension 27.

The action of bar 35 is controlled by the lever 41, which is mounted for slight pivotal movement on an extending ear 45 on the plate 17. To this end, the lever 41 is seated in a slot in the ear 45. Adjacent its mounting point, and at its end, the lever 41 has a lateral extension 46, upon which there is mounted on insulating saddle 47. A wire-like element 48 is looped about the saddle 47 and seats in a groove therein, and the ends of this element are secured to stationary terminals 49 and 50 mounted on an insulating block 51 on the plate 17. The terminal 49 also has secured thereto a resilient contact member 52 whose forwardly extending end 53 constitutes one element of a switch. To this end the portion 53 carries a contact which is adapted to engage an associated stationary contact 54 mounted on the base plate 18. A finger 55 is turned out from the contact member 52, and is engageable by an insulating disc 56 carried by the carriage plate 19. Normally, the disc 56 is out of engagement with the switch, and the resilience of the contact member 52 maintains the switch contacts in open position. When the carriage is lowered, however, the disc 56 engages the finger 55 and presses it downward, and this action brings the upper switch contact into engagement with the lower switch contact with a wiping action. This insures good electrical contact between the switch elements.

The wire element 48 is current-conductive and is of such character that it heats and expands rapidly when current is passed through it, and it cools and contracts very rapidly when the current is interrupted. Preferably this element is formed of resistance wire, known commercially as grade #C wire, which is composed of 60% nickel, 16% chrome and 24% iron. Of course, any other suitable material may be used.

As may be seen in Fig. 12, the thermostatic switch 13, the switch 53—54 and the element 48 are serially connected in the toaster circuit along with certain portions of the heating elements 8. In operation, the switch 53—54 is maintained closed as long as the bread carriage is latched in its toasting position. From Fig. 4, it may be seen that expansion of the element 48 will tend to permit the spring 42 to move the bar 35 downward, while contraction of the element 48 will tend to rock lever 41 counterclockwise, and thus tend to raise the bar 35 against the action of spring 42.

The structure thus far described is similar to that disclosed and claimed in a copending application of J. W. Myers, Serial No. 358,737, filed September 27, 1940. By means of such structure, the bread slices are toasted to a desired color, the thermostatic switch 13 controlling the energization of the thermal element 48 to trip the latching mechanism. In the present instance, the coloring operation takes place during the latter part of the toasting cycle. The structure now to be described effects the crisping of the bread slice to desired degree of crispness during the first part of the toasting cycle.

Figure 3:
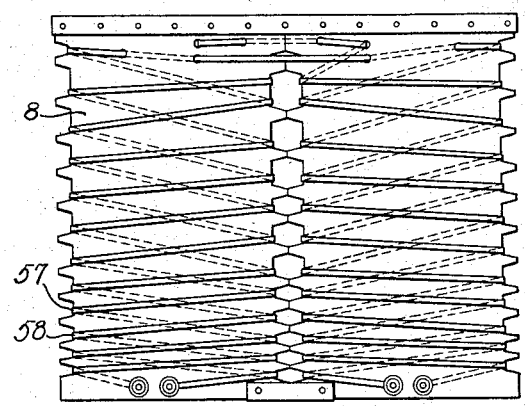
Fig. 3 is a side elevational view of one of the heating units.
Figure 7:
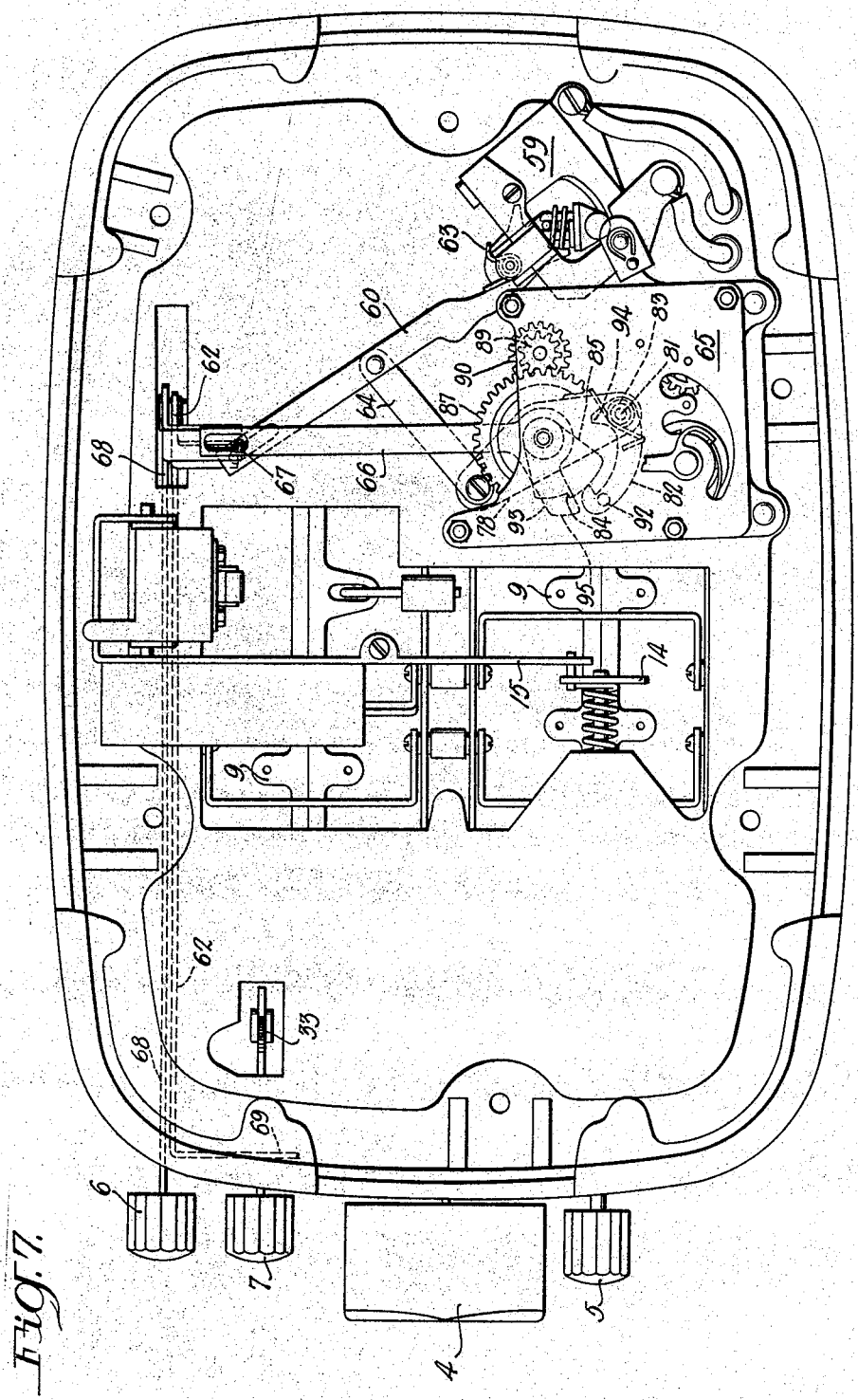
Fig. 7 is a bottom view of the same.

In order to provide a low average toasting rate during the first part of the toasting cycle, the heating elements 8, one of which is shown in Fig. 3, are wound with two sets of windings. A low wattage winding 57, preferably about 450 watts, and a higher wattage winding 58, preferably about 650 watts, are provided. In Fig. 12, the elements 57 and 58 represent collectively the low and high wattage windings. Actually there are a plurality of windings of each type forming two groups which are parallel-connected, as represented in Fig. 12. A switch 59 (see Figs. 6, 7 and 12) is provided in series with winding 58. The switch, as illustrated, is a conventional toggle switch which is operable by a lever 60. This lever is connected by a slot and pin connection 61 to a bell crank lever 62. A spring 63 tends to maintain switch 59 in the closed position, as shown in Fig. 7. Also attached to lever 60 is a member 64 which conditions a clockwork mechanism 65 for operation, as described later. An arm 66 for controlling the period of operation of the clockwork mechanism 65 (as described later) is connected by a slot and pin connection 67 to a bell crank lever 68. The two bell crank levers 62 and 68 are mounted on a common pivot, as shown in Fig. 9, the arrangement being such that lever 62 is free to turn readily on the pivot while lever 68 is frictionally held against turning except by manual operation.

Thus, it will be seen that whenever bell crank lever 62 is rotated counterclockwise, as viewed in Fig. 6, switch 59 will be opened, and clockwork mechanism 65 will be conditioned for operation. The energy stored in spring 63 will be slowly released through the clockwork mechanism until, at a time determined by the position of arm 66, member 64 will be freed by clockwork mechanism 65, as further described hereinafter, and will allow lever 60 to return to the position shown in Fig. 7, thus closing switch 59. The position of arm 66 may be varied by movement of bell crank lever 68, to give an interval from negligible time to the full period of operation of the clock, which is preferably 3 minutes or more. Bell crank lever 68 extends to the outside of the toaster body and has the knob 6 affixed to it, to allow manual adjustment of the position thereof.

Bell crank 62 has a lateral extension 69 thereon (see Figs. 4 and 8), which extends into proximity of bread carrier support 19. On the end of extension 69 is a pivoted member 70. A spring 71 tends to rotate member 70 counterclockwise. Normally this is prevented by guide 72 upon which an arm 73 of member 70 bears, as shown in Fig. 8. However, at the lowermost position of extension 69 (bell crank lever 62 in maximum counterclockwise position), guide 72 slopes away from arm 73, and member 70 is free to rotate counterclockwise. A pivoted arm 74 on bread carrier support 19 is adapted to engage a pin 75 on member 70, and thus move bell crank lever 62 counterclockwise. Arm 74 is urged counterclockwise by a spring 76. A stop 77 limits the counterclockwise movement of arm 74.

The clockwork mechanism 65 is illustrated in detail in Figs. 10 and 11 to which reference may now be had. The link 64, previously mentioned, is pivotally attached to lever 78 of the clockwork. Lever 78 is pivotally mounted on a stud 79 (see Fig. 11) affixed to the clock frame 80. A stud 81 rigidly attached to lever 78 carries a loosely mounted pawl 82 which is urged clockwise (as viewed in Fig. 10) by spring 83. The hooked end of pawl 82 is adapted to engage a shoulder 84 on member 85 which is keyed to a rotatable shaft 86. A gear 87 is loosely mounted on shaft 86 and is frictionally coupled to member 85 through a resilient disk 88. Gear 87 is connected through gears 89 and 90 (see Fig. 10) to an escapement mechanism (not shown) which is of conventional form.

The hooked end of pawl 82 carries a stud 91 on which is mounted a roller 92. A cam member 93, loosely mounted on stud 79, is engageable by roller 92 to release the pawl 82 from the shoulder 84, as described hereinafter. The arm 66 previously mentioned is integrally formed with cam member 93, as shown in Fig. 7. Adjustment of cam member 93 through arm 66 serves to determine the timing interval of the clockwork mechanism in a manner which will be apparent presently.

When lever 60 (Fig. 7) is moved clockwise, lever 78 of the clockwork is rotated clockwise and pawl 82 engages shoulder 84. At the same time, the projection 94 on the pawl engages member 85 and positions it for commencement of the timing cycle. The energy stored in spring 63 (Fig. 7) is transferred through lever 60, link 64 and lever 78 to member 85 which rotates slowly counterclockwise, its motion being governed by the escapement mechanism to which it is frictionally coupled. During this movement, the roller 92 rides up on the cam edge 95 of cam member 93 and gradually raises the hooked end of pawl 82 until it is disengaged from shoulder 84. When this takes place, the lever 60 is uncoupled from the clockwork mechanism and is free to move with a snap action to its switch-closing position, shown in Fig. 7, under the impetus of spring 63. The first part of the toasting cycle, controlled by the clockwork or timing mechanism, is thus completed.

From the above description, it will be seen that the time duration of the first part of the toasting cycle is dependent on the position of the cam member 93 which is adjustable through arm 66 and bell crank lever 68 by means of the crispness control knob 6. If the knob 6 is moved upward, cam member 93 will be moved counterclockwise, which will increase the timing interval, as may be clearly seen from Fig. 10. On the other hand, if knob 6 is moved downward, cam member 93 will be moved clockwise, thereby decreasing the timing interval.

The operation of the toaster as a whole is as follows: The operator chooses a given setting of color control knob 5 and of crisper knob 6. He places bread slices on the carrier within wells 2 and 3 and depresses knob 4. As knob 4 is lowered, arm 74 engages pin 75 on member 70. As the knob 4 continues downward, bell crank lever 62 is rotated counterclockwise. This opens switch 59 and conditions clockwork mechanism 65 for operation. At the bottom of its travel, support 19 is caught and held by latch 25. The pressure on pin 75 of member 70 is released, and the member rotates counterclockwise. Clockwork 65 then begins to release the energy in spring 63, and bell crank lever 62 begins to rotate slowly clockwise. Extension 69 moves upward and arm 73 moves adjacent guide 72 so that member 70 is rotated clockwise back to its normal position. At some point in the upward travel, depending upon the setting of knob 6, the member 64 will be released by the clockwork mechanism 65 and the bell crank lever 62 will move to its full clockwise position, moving extension 69 and its associated parts to their initial position. During this period, only the winding 57 has been energized, so that the bread has been drying but not coloring rapidly. The rate of heating of the bread is so low that the surface temperature of the bread is not sufficient to operate the thermostatic switch. When bell crank lever 62 goes to its full clockwise position, the switch 59 is closed and element 58 is energized. Under the higher toasting rate caused by the increased wattage, the bread is quickly toasted to the desired color. When this color has been reached, the thermostatic switch 13 will interrupt the energy to the elements, and the thermal element 48 will release latch 25 through its associated elements. When the support 19 rises to discharge the bread, arm 74 will ride over pin 75 of member 70, but will return to normal position under the influence of spring 76. All parts are thus returned to their initial position and the toaster is ready for the next operation.

Since the toasting cycle is always terminated under the control of thermostat 11, the color of toast obtained will be the same for a given color setting irrespective of the setting of knob 6. Moving knob 6 downward will result in a shorter time at the low wattage, and, consequently, a softer piece of bread. If knob 6 is moved to its lowermost position, member 64 will be released by the clockwork mechanism 65 after only a negligible period of time, so that practically no period of low wattage will occur. The operation is then substantially as a normal toaster, and the softest possible toast for the toaster results. Variation of color may be had by varying the adjustment of knob 5, as previously described.

It will be noted that thermal wire 48 is connected in series with element 57. This is desirable if a very long time clock is employed. For such a clock, at a light setting, the elements 57 may produce the desired color before the end of the crisping part of the toasting cycle. If the wire 48 were not such that it could be operated by the low current in element 57, the toasting operation would not be terminated at this time, but would be terminated upon the first "on-off" operation of the thermostatic switch 13 after the end of the clock period. This would result in an unnecessary delay and some darkening of the bread. This condition will only occur if a clock capable of running about 8 minutes or more is employed, and for clocks of 6 minutes or under, the wire 48 may be placed in series with the supply line without any possibility of the aforementioned undesirable operation.

While I have illustrated the invention with a clock controlling the first or crisping part of the toasting cycle, and a bread-responsive thermostat controlling the second or coloring part of the toasting cycle, it is obvious that any well known thermal or other timer might be substituted for the clockwork mechanism 65. Also, a clock or other timer might be substituted for thermostatic mechanism. In this case, however, an adjustment of crisper knob 6 to give a longer first part of the cycle would also have to adjust the timing mechanism to give a shorter second part, if exactly the same color bread is desired for the new crisper setting as for the old. Further, while I have shown two separate windings 57 and 58 to provide two average toasting rates, it is obvious that any other method of reducing the average toasting rate during the first part of the cycle might be employed.

It is, therefore, clear that this invention is capable of many embodiments and is not limited by the specific embodiment shown, but only by the scope of the appended claims.

I claim:

1. In an automatic toaster, means for initiating a toasting cycle, means for toasting a bread slice at a low average rate during the first part of the toasting cycle, thereby to effect crisping of the bread, manually-adjustable means for varying the duration of said first part of the toasting cycle to impart the desired degree of crispness to the bread, means for toasting the bread slice at a higher average toasting rate during a second part of the toasting cycle, thereby to effect coloring of the bread, and means for automatically terminating the toasting cycle when the bread has reached the desired color.

2. In an automatic toaster, means for initiating a toasting cycle, means for toasting a bread slice at a low average rate during the first part of the toasting cycle, thereby to effect crisping of the bread, adjustable timing means for controlling the duration of the first part of said cycle to impart the desired degree of crispness to the bread, means operable by said timing means to increase the toasting rate so as to toast the bread slice at a higher average rate during the remainder of said cycle, thereby to effect coloring of the bread, and means for automatically terminating said cycle when the bread has reached the desired color.

3. In an automatic toaster, means for initiating a toasting cycle, means for toasting a bread slice at a low average rate during the first part of said cycle, thereby to effect crisping of the bread, manually-adjustable means for varying the duration of said first part of said cycle to impart the desired degree of crispness to the bread, means for toasting the bread slice at a higher average rate during the remainder of said cycle, thereby to effect coloring of the bread, manually-adjustable means for varying the duration of the remainder of said cycle, and means for automatically terminating said toasting cycle when the bread has reached the desired color.

4. In an automatic toaster, means movable between two positions for initiating and terminating a toasting operation, means urging said movable means to its terminating position, a latch for holding said movable means in its initiating position, means for toasting bread at a low average rate to effect crisping of the bread, means operable by said movable means for initiating operation of said last-named means, means operable after a predetermined time to increase the average toasting rate to effect coloring of the bread, and means for tripping said latch when the toast has reached a desired color.

5. In an automatic toaster, means movable between two positions for initiating and terminating a toasting operation, means urging said movable means to its terminating position, a latch for holding said movable means in its initiating position, a manually-adjustable timer, means for toasting bread at a low average rate to effect crisping of the bread, means operable by said movable means for simultaneously initiating operation of said timer and said last-named means, means operable by said timer after a predetermined time to increase the average toasting rate to effect coloring of the bread, and means for automatically tripping said latch to terminate the toasting operation when the toast has reached a desired color.

6. In an automatic toaster, heating means for toasting a bread slice, means for initiating a toasting cycle, means responsive to said initiating means for energizing a portion only of said heating means to effect toasting at a low average rate during the first part of the toasting cycle, manually-operable means for varying the time interval during which the low heating rate prevails, means for energizing the entire heating means after the expiration of said time interval to effect toasting at a higher average rate during the latter part of the toasting cycle, manually-operable means for varying the time interval during which said higher rate prevails, and means for terminating the toasting cycle.

7. In an automatic toaster, heating means for toasting a bread slice, said heating means comprising shunt-connected sections, a switch in series with one of said sections in the branch circuit thereof, a timing mechanism, means for initiating a toasting cycle, means responsive to said initiating means for opening said switch and for starting said timing mechanism, whereby a portion only of said heating means is energized and the average toasting rate is low during the first part of the toasting cycle, means controlled by said timing mechanism for closing said switch after a predetermined time interval, whereby the entire heating means is energized and the average toasting rate is relatively high during the latter part of the toasting cycle, and means for terminating the toasting cycle.

8. In an automatic toaster, heating means for toasting a bread slice, said heating means comprising shunt-connected sections, a switch in series with one of said sections in the branch circuit thereof, a timing mechanism, means for initiating a toasting cycle, means responsive to said initiating means for opening said switch and for starting said timing mechanism, whereby a portion only of said heating means is energized and the average toasting rate is low during the first part of the toasting cycle, manually-adjustable means for varying the timing interval of said timing mechanism, means controlled by said timing mechanism for closing said switch after a predetermined time interval, whereby the entire heating means is energized and the average toasting rate is relatively high during the latter part of the toasting cycle, and means for terminating the toasting cycle.

9. In an automatic toaster, heating means for toasting a bread slice, said heating means comprising shunt-connected sections, a switch in series with one of said sections in the branch circuit thereof, a timing mechanism, means for initiating a toasting cycle, means responsive to said initiating means for opening said switch and for starting said timing mechanism, whereby a portion only of said heating means is energized and the average toasting rate is low during the first part of the toasting cycle, means controlled by said timing mechanism for closing said switch after a predetermined time interval, whereby the entire heating means is energized and the average toasting rate is relatively high during the latter part of the toasting cycle, and means including a thermostatic switch in circuit with said heating means and operable only by the higher rate of heating for terminating the toasting cycle after a predetermined period of operation at the higher average toasting rate.

10. In an automatic toaster, heating means for toasting a bread slice, said heating means comprising shunt-connected sections, a switch in series with one of said sections in the branch circuit thereof, a timing mechanism, means for initiating a toasting cycle, means responsive to said initiating means for opening said switch and for starting said timing mechanism, whereby a portion only of said heating means is energized and the average toasting rate is low during the first part of the toasting cycle, manually-adjustable means for varying the timing interval of said timing mechanism, means controlled by said timing mechanism for closing said switch after a predetermined time interval, whereby the entire heating means is energized and the average toasting rate is relatively high during the latter part of the toasting cycle, means including a thermostatic switch in circuit with said heating means and operable only by the higher rate of heating for terminating the toasting cycle after a predetermined period of operation at the higher average toasting rate, and manually-adjustable means for said thermostatic switch for varying the period of operation at the higher average rate.

11. In an automatic toaster, heating means for toasting a bread slice, said heating means comprising shunt-connected sections, a switch in series with one of said sections in the branch circuit thereof, a timing mechanism, means for initiating a toasting cycle, means responsive to said initiating means for opening said switch and for starting said timing mechanism, whereby a portion only of said heating means is energized and the average toasting rate is low during the first part of the toasting cycle, manually-adjustable means for varying the timing interval of said timing mechanism, means controlled by said timing mechanism for closing said switch after a predetermined time interval, whereby the entire heating means is energized and the average toasting rate is relatively high during the latter part of the toasting cycle, means including a thermostatic element responsive to the surface temperature of the bread slice for terminating the toasting cycle after a predetermined period of operation at the higher average toasting rate, and manually-adjustable means for varying the period of operation at the higher average rate.

12. In an automatic toaster, heating means for toasting a bread slice, said heating means comprising shunt-connected sections, a switch in series with one of said sections in the branch circuit thereof, a timing mechanism, means for initiating a toasting cycle, means responsive to said initiating means for opening said switch and for starting said timing mechansim, whereby a portion only of said heating means is energized and the average toasting rate is low during the first part of the toasting cycle, means controlled by said timing mechanism for closing said switch after a predetermined time interval, whereby the entire heating means is energized and the average toasting rate is relatively high during the latter part of the toasting cycle, a thermal trip mechanism for terminating the toasting cycle, said trip mechanism including a thermal element in circuit with said heating means, and a thermostatic switch in circuit with said heating means and said thermal element for operating said trip mechanism after a predetermined period of operation at the higher average toasting rate.

13. In an automatic bread toaster, an adjustable crispness control manual, an adjustable color control manual, means for applying heat to the bread at a relatively low average rate during a first time interval whose duration is determined by the setting of said first-named manual, means for applying heat to the bread at a higher average rate during a second time interval whose duration is determined by the setting of said last-named manual, and means for automatically terminating the toasting cycle at the expiration of said second time interval.

14. In an automatic toaster, a vertically movable bread carriage, electrical heating means adapted to be conditioned for operation at relatively low and high average toasting rates, means operable by downward movement of said carriage to condition said heating means for operation at its low average heating rate, thereby to effect crisping of the bread, means operative to condition said heating means for operation at its high average heating rate after a time interval, thereby to effect coloring of the bread, and means for automatically moving said bread carriage upward after a second time interval, thereby to terminate the toasting operation.

15. In an automatic toaster, a vertically movable bread carriage, electrical heating means adapted to be conditioned for operation at relatively low and high average toasting rates, a timing mechanism, means operable by downward movement of said carriage to initiate operation of said timing mechanism and to condition said heating means for operation at its low average heating rate, thereby to effect crisping of the bread, means operable by said timing mechanism to condition said heating means for operation at its high average heating rate after a time interval, thereby to effect coloring of the bread, and thermostatic means for interrupting the operation of said heating means and for effecting upward movement of said bread carriage after a second time interval, thereby to terminate the toasting operation.

16. In an automatic toaster, a vertically movable bread carriage, electrical heating means comprising shunt-connected sections, a switch in series with one of said sections in the branch circuit thereof, means operable by downward movement of said bread carriage to open said switch, thereby to condition said heating means for operation at a low average rate to effect crisping of the bread, means operative to close said switch after a time interval, thereby to condition said heating means for operation at a high average rate to effect coloring of the bread, and means for automatically moving said bread carriage upward after a second time interval, thereby to terminate the toasting operation.

17. In an automatic toaster, means for initiating a toasting cycle, means for toasting a bread slice at a low average rate during the first part of the toasting cycle, thereby to effect crisping of the bread, means for toasting the bread slice at a higher average rate during a second part of the toasting cycle, thereby to effect coloring of the bread, thermostatic means responsive to the higher rate of toasting, and thermal trip means controlled by said thermostatic means to terminate the toasting cycle.

18. In an automatic toaster, heating means capable of operation at relatively low and high average toasting rates, means for operating said heating means at its low average toasting rate during the first part of the toasting cycle, means for operating said heating means at its high average toasting rate during the latter part of the toasting cycle, a thermal trip mechanism for terminating the toasting cycle, said trip mechanism including a thermal element in circuit with said heating means, and a thermastatic switch in circuit with said heating means and said thermal element for operating said trip mechanism after a predetermined period of operation at the higher average toasting rate.

THOMAS TALBOT NELSON BUCHER.